US008019761B2

(12) United States Patent
Uehara et al.

(10) Patent No.: US 8,019,761 B2
(45) Date of Patent: Sep. 13, 2011

(54) RECORDING MEDIUM STORING A DESIGN SUPPORT PROGRAM, DESIGN SUPPORT METHOD, AND DESIGN SUPPORT APPARATUS

(75) Inventors: Yusuke Uehara, Kawasaki (JP); Takayuki Baba, Kawasaki (JP); Susumu Endo, Kawasaki (JP); Shuichi Shiitani, Kawasaki (JP); Daiki Masumoto, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 12/008,737

(22) Filed: Jan. 14, 2008

(65) Prior Publication Data

US 2008/0172379 A1    Jul. 17, 2008

(30) Foreign Application Priority Data

Jan. 17, 2007  (JP) ................................. 2007-008037

(51) Int. Cl.
*G06F 17/30* (2006.01)
(52) U.S. Cl. .................... 707/737; 707/602; 707/796
(58) Field of Classification Search .................. 707/3, 4, 707/5, 6, 100, 102, 104.1, 600, 602, 737, 707/739, 999.003, 999.004, 999.005, 999.006, 707/999.1, 999.102, 999.104, 796
See application file for complete search history.

(56) References Cited

U.S. PATENT DOCUMENTS

| | | | | |
|---|---|---|---|---|
| 5,430,873 A * | 7/1995 | Abe et al. ...................... | 717/113 |
| 5,991,709 A * | 11/1999 | Schoen ............................. | 704/1 |
| 6,137,911 A * | 10/2000 | Zhilyaev ....................... | 382/225 |
| 6,405,189 B1 * | 6/2002 | Gillis ................................ | 707/3 |
| 6,968,516 B2 * | 11/2005 | Kanda et al. ...................... | 716/1 |
| 7,266,254 B2 * | 9/2007 | Ishikawa et al. ............... | 382/305 |
| 2002/0124010 A1* | 9/2002 | Park et al. ...................... | 707/200 |
| 2003/0191614 A1* | 10/2003 | Morikawa et al. ................. | 703/8 |
| 2004/0153467 A1* | 8/2004 | Conover et al. ............... | 707/100 |
| 2005/0120006 A1* | 6/2005 | Nye ................................. | 707/3 |

FOREIGN PATENT DOCUMENTS

| | | |
|---|---|---|
| JP | A 2001-307099 | 11/2001 |
| JP | B2 3513562 | 3/2004 |

* cited by examiner

*Primary Examiner* — Greta Robinson
(74) *Attorney, Agent, or Firm* — Greer, Burns & Crain, Ltd

(57) ABSTRACT

A design support apparatus extracts feature data corresponding to design data to be searched upon receiving the design data to be searched. The apparatus checks the extracted feature data against the feature data associated with the feature associated information, ordering the design data associated with the feature associated information in descending order of similarity to the design data to be searched, retrieving one piece of the ordered design data. The apparatus generates a classification hierarchy consisting of pieces of classification data obtained by classifying a set of the retrieved design data based on a degree of feature similarity using the feature data associated with the feature associated information. The apparatus selects the design information closely associated with the classification data by fetching the design information corresponding to the design data contained in the classification data from the design associated information associating the design data and the design information.

11 Claims, 13 Drawing Sheets

| 3D DATA ID | FEATURE DATA ID |
|---|---|
| #00001 | #0000X |
| #00002 | #0000Y |
| ⋮ | ⋮ |
| #01478 | #00XXX |

FIG. 6

| 3D DATA ID | CLASSIFICATION HIERARCHY LABEL | | |
|---|---|---|---|
| | FIRST LEVEL | SECOND LEVEL | THIRD LEVEL |
| #00001 | 01 | 01 | 01 |
| #00002 | 01 | 02 | 02 |
| ⋮ | ⋮ | ⋮ | ⋮ |
| #01478 | 01 | 02 | 03 |

FIG. 7

| 3D DATA ID | DESIGN INFORMATION ID |
|---|---|
| #00001 | #0000A |
| #00002 | #0000B |
| ⋮ | ⋮ |
| #01478 | #0B0AC |

RECORDING MEDIUM STORING A DESIGN SUPPORT PROGRAM, DESIGN SUPPORT METHOD, AND DESIGN SUPPORT APPARATUS

BACKGROUND OF THE INVENTION

1. Field of the Invention

The present invention relates to a recording medium storing a design support program, a design support method, and a design support apparatus, in which design information considering a range of similarity is provided.

2. Description of the Related Art

In the field of design/manufacturing, a designer uses 3D (Dimension)-CAD to design components of a machine and the like. First, the designer describes skills and know-how in design such as faults that occurred due to shapes in a processing stage, inspection stage, assembly stage, usage stage and the like after designing, measures taken against such faults, and problems in manufacturing costs in text or the like as design information. Then, such design information is stored by associating with 3D data designed by 3D-CAD.

To design a new component or the like, the designer searches for components designed/manufactured in the past that are similar in shape to the component to be designed and checks up design information thereof. So, compared with a case in which problems are detected after designing, it is desired to reduce design changes by detecting problems of design in the design stage, thereby reducing design/manufacturing costs.

Here, a method of reducing labor of the designer required to check up associated design information by using newly designed 3D data as a search key, searching for 3D data having similar shapes, and extracting design information associated with 3D data of such a search result from a database has been known. For example, a method of calculating the degree of similarity between 3D data based on a ratio of the volume overlapped when two pieces of 3D data to be compared are superposed on each other has been known (e.g. Japanese Laid-open Patent Publication No. 2001-307099). Also, a method of calculating the degree of similarity between 3D data based on the degree of similarity of analysis trees after constructing such analysis trees based on each surface obtained by dividing the surface of 3D data and geometrical adjacency of each surface has been known (e.g. Japanese Patent No. 3513562). Also, a method of calculating the degree of similarity between 3D data by extracting polygon information from 3D data and comparing information of each polygon when it is divided into a certain size or less as features of the 3D data has been known (e.g. Japanese Patent No. 3614761).

Incidentally, design information includes such design information having content regarding a partial (local) shape. For example, some types of design information have content regarding an overall shape such as "Strength falls as the overall aspect ratio increases" and other types of design information have content regarding a partial (local) shape such as "Processing costs are high if the screw hole is small".

However, such a "range of similarities" is not considered in the conventional technology. On the other hand, the designer thinks that he (she) wants to check up design information regarding an overall shape together or design information regarding a partial shape together. Thus, in the conventional technology, the designer must systematically arrange obtained search results in design information regarding an overall shape, design information regarding a partial shape, and design information regarding an intermediate range thereof, creating a problem of work load thereof.

SUMMARY

According to an aspect of an embodiment, a computer readable recording medium stores a design support program executed by a computer. The program provides information considering a range of similarity, and causes the computer to execute the steps of: storing feature associated information associating a plurality of pieces of design data that can be classified for each structure and feature data provided corresponding to each piece of the design data and representing features of the design data; extracting the feature data corresponding to the design data to be searched upon receiving the design data to be searched; checking the extracted feature data against the feature data associated with the feature associated information, ordering the design data associated with the feature associated information in descending order of similarity to the design data to be searched, retrieving at least one piece of the ordered design data; generating a classification hierarchy consisting of a plurality of pieces of classification data obtained by classifying a set of the retrieved design data based on a degree of feature similarity using the feature data associated with the feature associated information; selecting the design information closely associated with the classification data by fetching the design information corresponding to the design data contained in the classification data from the design associated information associating the design data and the design information; and displaying the classification data in a predetermined form together with the selected design information.

BRIEF DESCRIPTION OF THE DRAWINGS

FIG. 6 is a diagram showing a classification hierarchy table;

FIG. 7 is a diagram showing a design information table;

DETAILED DESCRIPTION OF THE EMBODIMENTS

Figure 1:
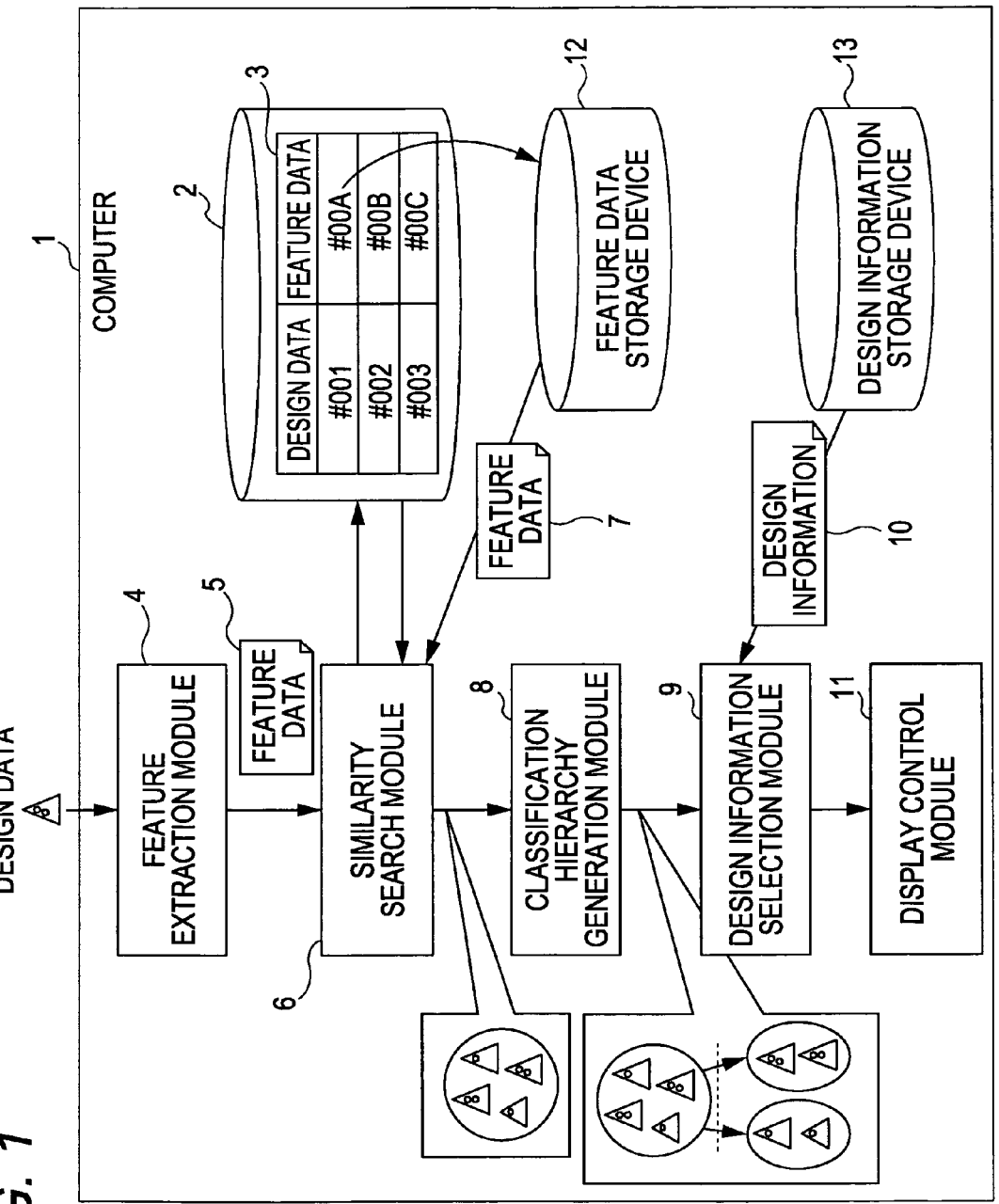
FIG. 1 is a diagram showing an overview of an embodiment of the present invention.

FIG. 1 is a diagram showing an overview of an embodiment of the present invention.

A computer 1 shown in FIG. 1 is programmed to perform various functions, and includes a feature associated information storage device 2, a feature extraction software module 4, a similarity search software module 6, a classification hierarchy generation module 8, and a display control software module 11. The software modules are part of a design support program.

The feature associated information storage device 2 stores a plurality of pieces of design data classified into a plurality of types and feature associated information 3 corresponding to each piece of design data and associated with feature data showing features of design data.

Upon receipt of design data to be searched, the feature extraction module 4 extracts feature data 5 of the design data to be searched.

The similarity search module 6 acquires design data associated with the feature associated information 3 by checking the feature data 5 extracted from the feature extraction module 4 against feature data 7 associated with the feature associated information 3. The similarity search module 6 orders obtained design data in descending order of similarity to the design data to be searched before retrieving at least one piece of design data from the ordered design data. Here, the feature data 7 is extracted from feature data storage device 12 in which a plurality of pieces of feature data are stored in advance. Though the feature data storage device 12 is provided in the computer 1 in FIG. 1, it may be provided outside the computer 1. Four pieces of design data are retrieved by the similarity search module 6 in FIG. 1.

The classification hierarchy generation module 8 uses feature data associated with the feature associated information 3 to generate a classification hierarchy having a plurality of pieces of classification data classified based on the degree of similarity of features from a set of design data retrieved by the similarity search module 6. In FIG. 1, the design data is shown in a two-level hierarchy (upper level, lower level). The lower level has its classifications set finer than the upper level.

Design information selection module 9 fetches design information 10 corresponding to design data contained in classification data from design associated information in which design data and design information are associated before selecting design information closely associated with the classification data. Here, the design information 10 is fetched from design information storage device 13 in which a plurality of pieces of design information are stored in advance. Though the design information storage device 13 is provided in the computer 1 in FIG. 1, it may be provided outside the computer 1.

The display control module 11 displays classification data together with design information selected by the design information selection module 9 in a predetermined form.

According to the computer 1 on which such a design support program functions, upon receipt of design data to be searched, the feature extraction module 4 extracts the feature data 5 corresponding to the design data to be searched. The similarity search module 6 checks the feature data 5 extracted by the feature extraction module 4 against the feature data 7 associated with the feature associated information 3. Then, the similarity search module 6 orders the design data associated with the feature associated information in descending order of similarity to the design data to be searched before retrieving at least one piece of design data from the ordered design data. Then, the classification hierarchy generation module 8 generates a classification hierarchy by classifying a set of design data retrieved by the similarity search module 6 based on the degree of similarity of features. The design information selection module 9 fetches design information 10 to select design information closely associated with classification data. The display control module 11 displays classification data together with design information selected by the design information selection module 9 in a predetermined form.

An embodiment of the present invention will be described below.

Figure 2:
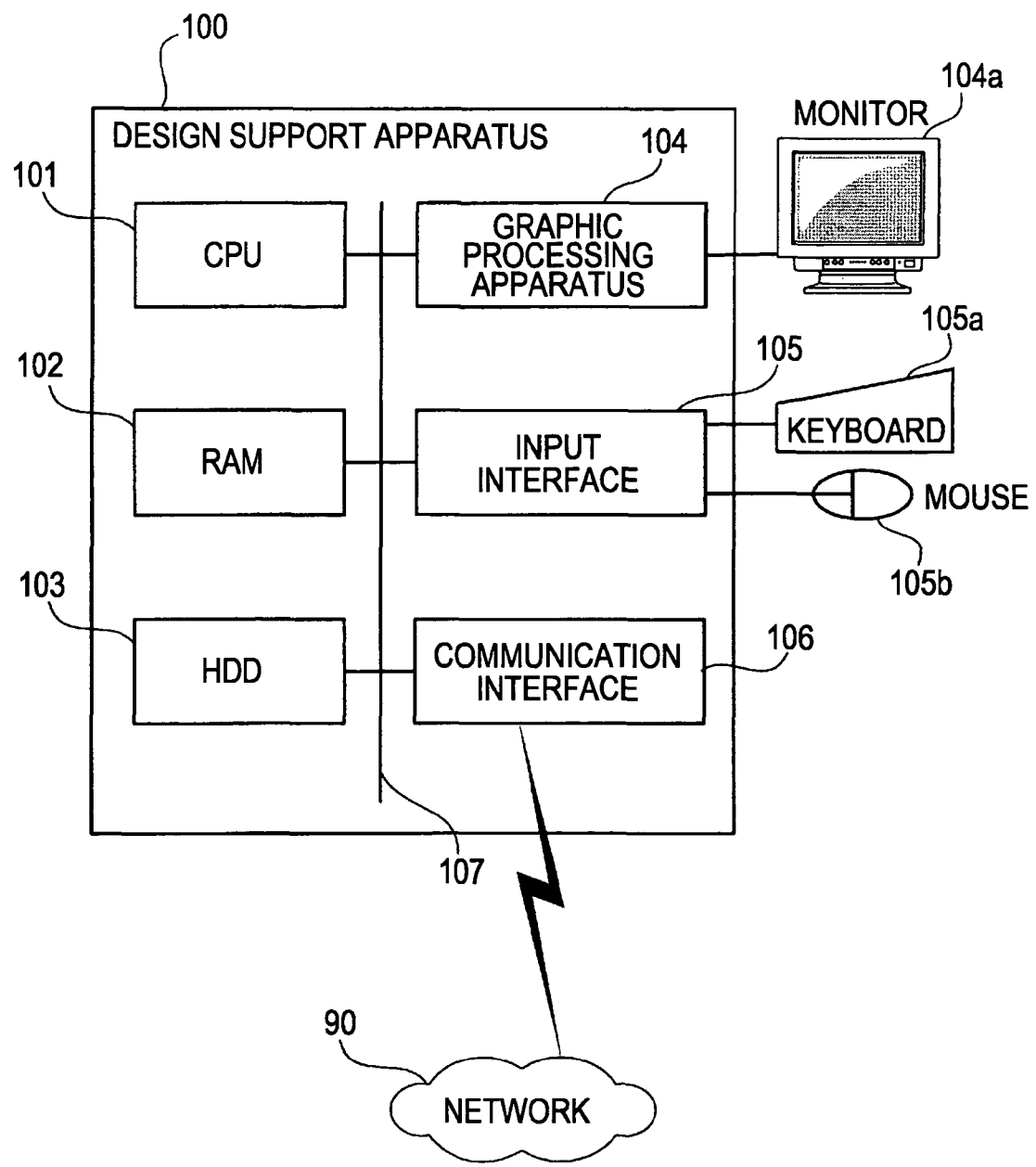
FIG. 2 is a diagram showing a hardware configuration example of a design support apparatus.

FIG. 2 is a diagram showing a hardware configuration example of a design support apparatus.

A design support apparatus 100 uses a CPU (Central Processing Unit) 101 to control the entire apparatus. The CPU 101 connects a RAM (Random Access Memory) 102, a hard disc drive (HDD) 103, a graphic processing apparatus 104, an input interface 105, and a communication interface 106 via a bus 107.

The RAM (Random Access Memory) 102 temporarily stores at least a portion of OS (Operating System) programs and application programs the CPU 101 is caused to execute. The RAM 102 also stores various kinds of data required for processing by the CPU 101. The HDD 103 stores OS and application programs. The HDD 103 also stores program files.

The graphic processing apparatus 104 connects a monitor 104a. The monitor 104a includes, for example, a CRT (Cathode Ray Tube), liquid crystal display, and a plasma display.

The graphic processing apparatus 104 displays images on the screen of the monitor 104a according to instructions of the CPU 101. A keyboard 105a and a mouse 105b are connected to the input interface 105. The input interface 105 transmits a signal (operation instructions of a designer such as read instructions of 3D data (described later) of the search key from the designer) transmitted from the keyboard 105a or mouse 105b to the CPU 101 via the bus 107.

The communication interface 106 is connected to a network 90. The communication interface 106 exchanges data with other computers via the network 90.

With the hardware configuration described above, processing functions of the present embodiment can be realized. In order to search for design information in the design support apparatus 100 having the hardware configuration described above, functions described below are provided in the design support apparatus 100.

Figure 3:
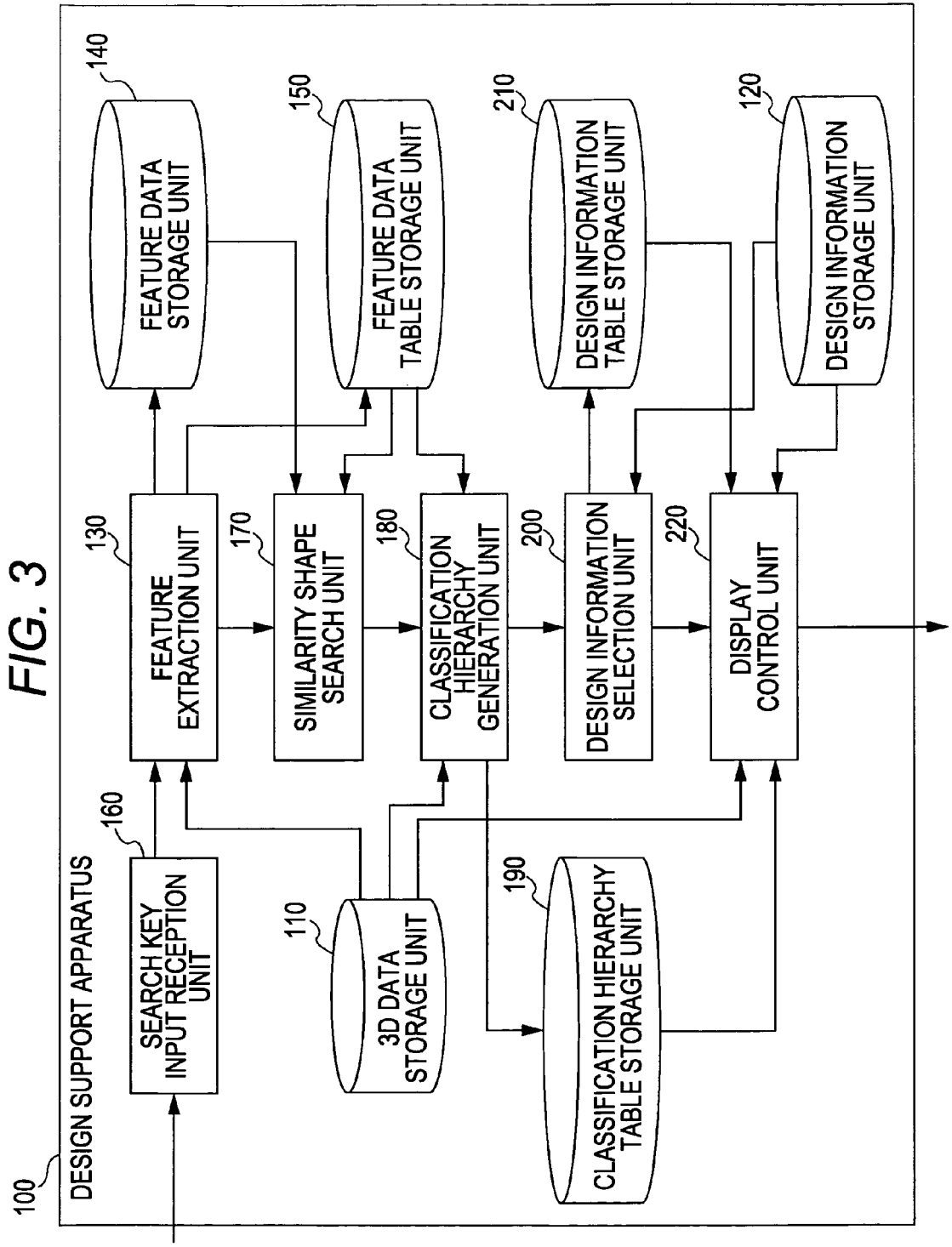
FIG. 3 is a block diagram showing functions of the design support apparatus.

FIG. 3 is a block diagram showing functions of the design support apparatus.

The design support apparatus 100 comprises a 3D data storage unit 110, a design information storage unit 120, a feature extraction unit 130, a feature data storage unit 140, a feature data table storage unit 150, a search key input reception unit 160, a similarity shape search unit 170, a classification hierarchy generation unit 180, a classification hierarchy table storage unit 190, a design information selection unit 200, a design information table storage unit 210, and a display control unit 220.

The 3D data storage unit 110 stores 3D data (design data) of machine components and the like designed by 3D-CAD.

The design information storage unit 120 stores design information representing design know-how and skills by text for 3D data designed by 3D-CAD.

Figures 4, 5:
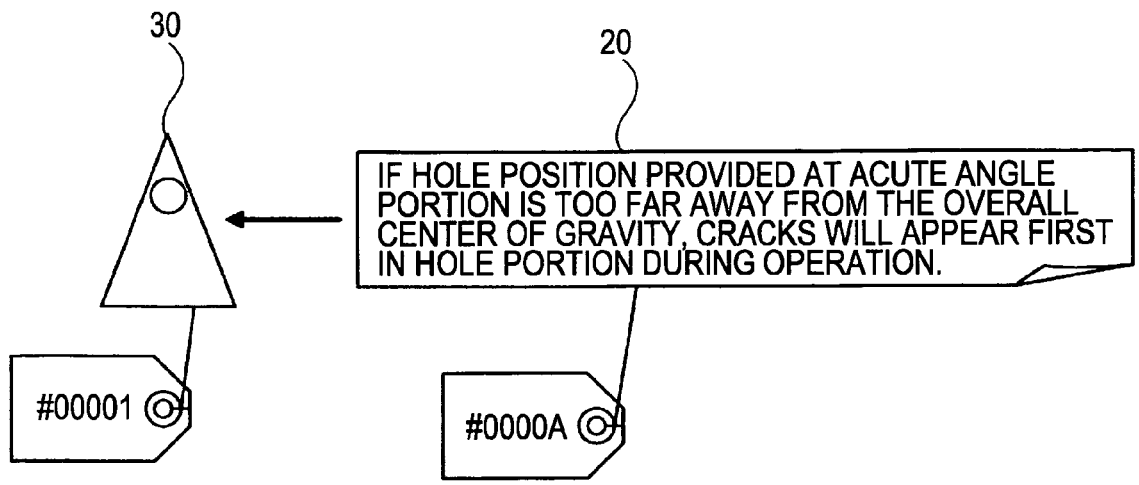
FIG. 4 is a diagram exemplifying design information.
FIG. 5 is a diagram showing a feature data table.

FIG. 4 is a diagram exemplifying design information.

Design information (design information 20 in FIG. 4) is information one piece or a plurality of pieces of which are set for each piece of 3D data (3D data 30 in FIG. 4). Design information includes fault information resulting from shapes caused in the design step and the processing step, assembly step, test step, operation step and the like after the design step and information about manufacturing costs.

3D data also has a 3D data ID set for uniquely determining the 3D data and design information has a design information ID set for uniquely determining the design information. In FIG. 4, for example, the 3D data 30 has a 3D data ID "#00001" set to it and the design information 20 has a design information ID "#0000A" set to it.

The embodiment of the present invention will be described by returning to FIG. 3.

The feature extraction unit 130 extracts feature data representing features of shape in quantity from 3D data designed by 3D-CAD before storing the data in the feature data storage unit 140.

The shape distribution method (R. Osada, T. Funkhouser, B. Chazelle, and D. Dobkin, Shape Distributions, ACM Transactions on Graphics, 21(4), pp. 807-832, October, 2002, for example) is a publicly known technology for extracting feature data. This technology has some implementation procedures and in one of them, sampling is performed at a predetermined number of points on the surface of 3D data, as many combinations of two points as a predetermined number are selected from a plurality of sampled points, euclidean distances between these two points are calculated, and a histogram of frequency distribution of the distances is represented as a vector. The degree of similarity in shape between 3D data increases as the euclidean distance between such vectors decreases. The extraction method of feature data by the feature extraction unit 130 is not limited to the shape distribution method and any method of extracting feature data representing shape features of 3D data may be used, but the feature data must be represented as a vector.

The feature extraction unit 130 stores extracted feature data as binary data in the feature data storage unit 140.

The feature extraction unit 130 also creates a table (feature data table) for uniquely determining (identifying) 3D data of an extraction source of the extracted feature data.

FIG. 5 is a diagram showing a feature data table.

A feature data table 151 is provided with 3D data ID and feature data ID columns. Information pieces arranged in the horizontal direction of each column are mutually associated.

IDs identifying 3D data are set to the 3D data ID column.

IDs identifying feature data are set to the feature data ID column.

Correspondence between feature data and 3D data is managed by the feature data table 151. The feature extraction unit 130 searches for 3D data stored in the 3D data storage unit 110 relying on 3D data IDs set in the 3D data ID column of the feature data table 151. Then, feature extraction unit 130 searches for feature data stored in the feature data storage unit 140 relying on feature data IDs set in the feature data ID column. In this way, feature data (3D data) corresponding to 3D data (feature data) can be searched.

The embodiment of the present invention will be described by returning to FIG. 3.

The feature data storage unit 140 stores feature data extracted by the feature extraction unit 130.

The feature data table storage unit 150 stores the feature data table 151 created by the feature extraction unit 130.

The search key input reception unit 160 reads 3D data instructed as a search key by the keyboard 105*a* or mouse 105*b*. The 3D data to be a search key is assumed to have been designed by 3D-CAD and a designer specifies a file name or the like to identify the 3D data via the keyboard 105*a* or mouse 105*b*.

Upon receipt of feature data extracted by the feature extraction unit 130 from 3D data of the search key read by the search key input reception unit 160, the similarity shape search unit 170 checks the received feature data against feature data of 3D data to be searched stored in the feature data storage unit 140. Then, the similarity shape search unit 170 orders 3D data to be searched in descending order of similarity (in descending order of degree of similarity) to 3D data of the search key to retrieve a predetermined number of pieces of 3D data from the top.

The classification hierarchy generation unit 180 uses feature data stored in the feature data storage unit 140 to classify a set of search resultant 3D data retrieved by the similarity shape search unit 170 in stages based on the degree of similarity in shape. That is, the classification hierarchy generation unit 180 generates for a search key a classification hierarchy of clusters in such a way that the range of regions similar to a cluster of 3D data groups in which only overall shapes are similar and that of regions similar to a cluster of 3D data groups in which only local shapes are similar are made more apparent in stages from a cluster of 3D data groups in which 3D data whose overall shape is similar and 3D data whose local shape is similar are mixed. A generation method of the classification hierarchy will be described later. Subsequently, the classification hierarchy generation unit 180 creates a classification hierarchy table that associates the generated classification hierarchy and 3D data belonging to the classification hierarchy. Correspondence between the classification hierarchy and 3D data will be managed by this classification hierarchy table.

FIG. 6 is a diagram showing a classification hierarchy table.

A classification hierarchy table 191 is provided with 3D data ID and classification hierarchy label columns. The classification hierarchy label column is subdivided into first-level, second-level, and third-level (each level) columns. Information pieces arranged in the horizontal direction of each column are mutually associated.

IDs identifying 3D data are set to the 3D data ID column.

Numbers identifying clusters at each level are set to the first-level, second-level, and third-level columns of the classification hierarchy label. Incidentally, the number of levels is determined by a clustering method described later.

The classification hierarchy label numerically represents to which cluster at each level from the first level each piece of 3D data belongs. To which cluster at each level each piece belongs is represented by 2-digit numerical values "01" and "02." The classification hierarchy labels of 3D data whose ID is, for example, "00002" are "01" for the first level, "02" for the second level, and "02" for the third level and represent that 3D data belongs to the first cluster at the first level, to the second cluster at the second level, and to the second cluster at the third level.

The embodiment of the present invention will be described by returning to FIG. 3.

The classification hierarchy table storage unit 190 stores the classification hierarchy table 191.

The design information selection unit 200 reads from the design information storage unit 120 design information corresponding to a cluster of each 3D data group, which is a result of hierarchical classification generated by the classification hierarchy generation unit 180. Then, the classification hierarchy table storage unit 190 selects design information associated with the cluster but not associated with other 3D data groups to be searched (design information associated with the cluster only) from a set of design information thereof. A selection method of design information will be described later. The design information selection unit 200 creates a design information table for determining (identifying) the associated design information for each piece of 3D data associated with the selected design information. Correspondence between the design information and 3D data will be managed by this design information table.

FIG. 7 is a diagram showing a design information table.

A design information table 201 is provided with 3D data ID and design information ID columns. Information pieces arranged in the horizontal direction of each column are mutually associated.

IDs identifying 3D data are set to the 3D data ID column.

IDs identifying feature data are set to the design information ID column.

The embodiment of the present invention will be described by returning to FIG. 3.

The design information table storage unit 210 stores the design information table 201.

The display control unit 220 arranges search resultant 3D data in ways by which a classification result of the depth of hierarchy level specified by the keyboard 105a or mouse 105b in a classification hierarchy generated by the classification hierarchy generation unit 180 can visually be understood. Further, the display control unit 220 arranges design information selected by the design information selection unit 200 for each cluster in the classification hierarchy.

Next, the operation of the design support apparatus 100 when a designer searches for desired 3D data and design information using the design support apparatus 100 will be described.

<First Search Method>

Figure 8:
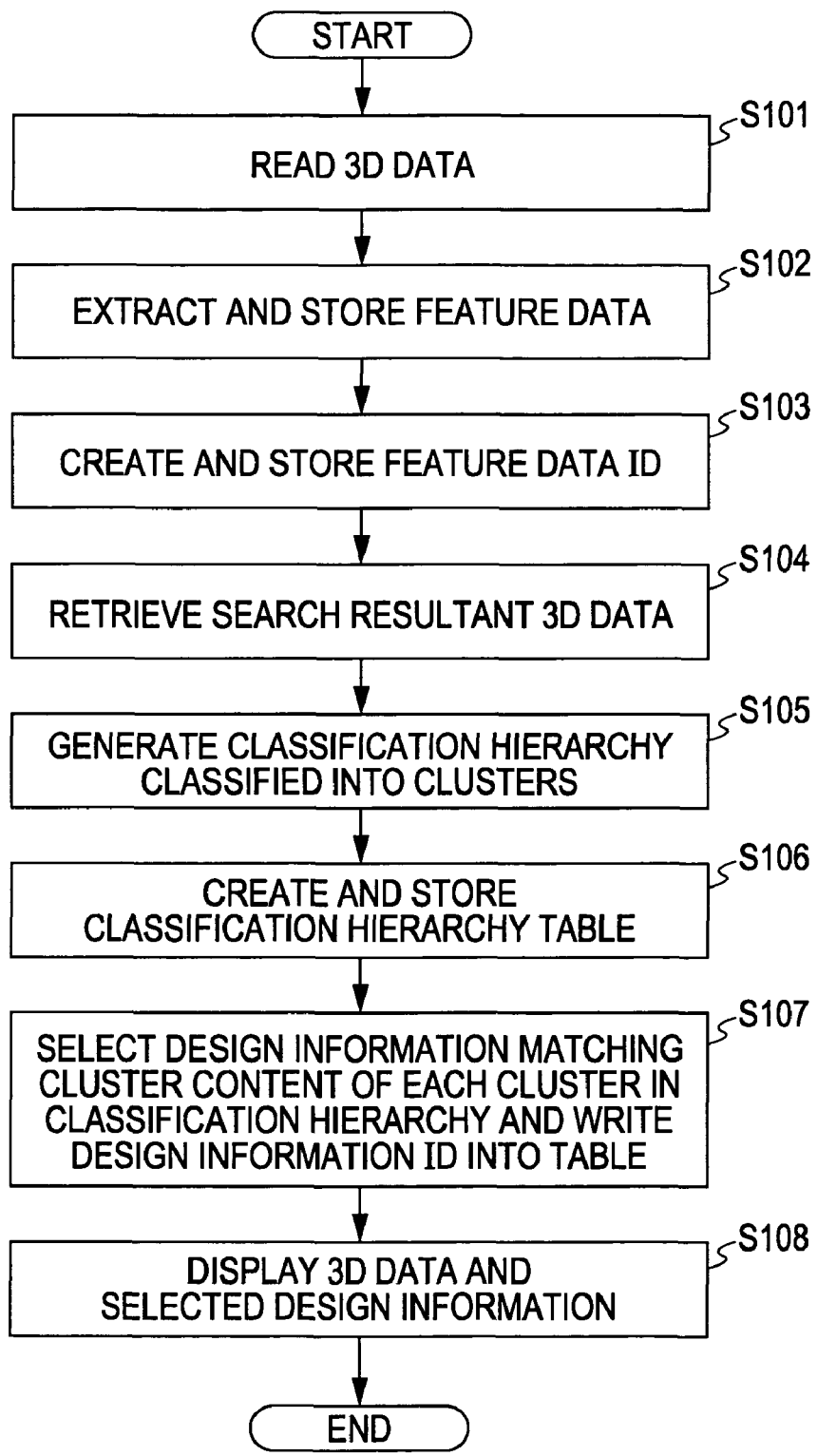
FIG. 8 is a flow chart showing an operation during a search.

FIG. 8 is a flow chart showing an operation during a search.

First, when 3D data to be a search key (hereinafter referred to as 3D data to be searched) is specified by operating the keyboard 105a or mouse 105b, the search key input reception unit 160 reads 3D data to be searched (step S101).

Next, the feature extraction unit 130 extracts feature data representing shape features from the read 3D data to be searched as a vector and stores the vector in the feature data storage unit 140 (step S102).

Next, the feature extraction unit 130 creates a feature data ID corresponding to the extracted feature data and associates the feature data ID with a 3D data ID of 3D data to be searched (hereinafter referred to as a 3D data ID to be searched) before storing it in the feature data table 151 (step S103).

Next, the similarity shape search unit 170 reads all feature data stored in the feature data storage unit 140 and calculates euclidean distances between 3D data to be searched and the feature data. Then, the similarity shape search unit 170 orders 3D data to be searched in ascending order of euclidean distance, selecting a predetermined number of 3D data IDs from the top as a search result (step S104). The 3D data is thereby retrieved.

Next, the classification hierarchy generation unit 180 references the feature data table 151, reads feature data IDs corresponding to the search resultant 3D data IDs, and uses the read feature data IDs to generate a classification hierarchy in which the search resultant 3D data is classified in stages (step S105).

Next, the classification hierarchy generation unit 180 uses the generated classification hierarchy and 3D data IDs belonging to the classification hierarchy to create the classification hierarchy table 191 and stores it in the classification hierarchy table storage unit 190 (step S106).

Next, the design information selection unit 200 reads design information of 3D data belonging to each cluster in the classification hierarchy from the design information storage unit 120. Then, the design information selection unit 200 selects design information matching common features regarding shapes of 3D data groups classified for the cluster from among design information groups thereof and writes design information IDs into the design information table 201 (step S107).

Next, when the level of classification hierarchy is specified from the keyboard 105a or mouse 105b of the designer, the display control unit 220 arranges 3D data and headlines of design information in ways that shapes of 3D data belonging to each of a group of clusters corresponding to the depth of the classification hierarchy specified by the designer and content of design information selected by the design information selection unit 200 become visually understandable. Then, the display control unit 220 causes the monitor 104a to display 3D data and headlines (step S108).

The operation during a search is now completed.

Next, the generation method of a classification hierarchy in step S105 will be described in detail.

Figure 9:
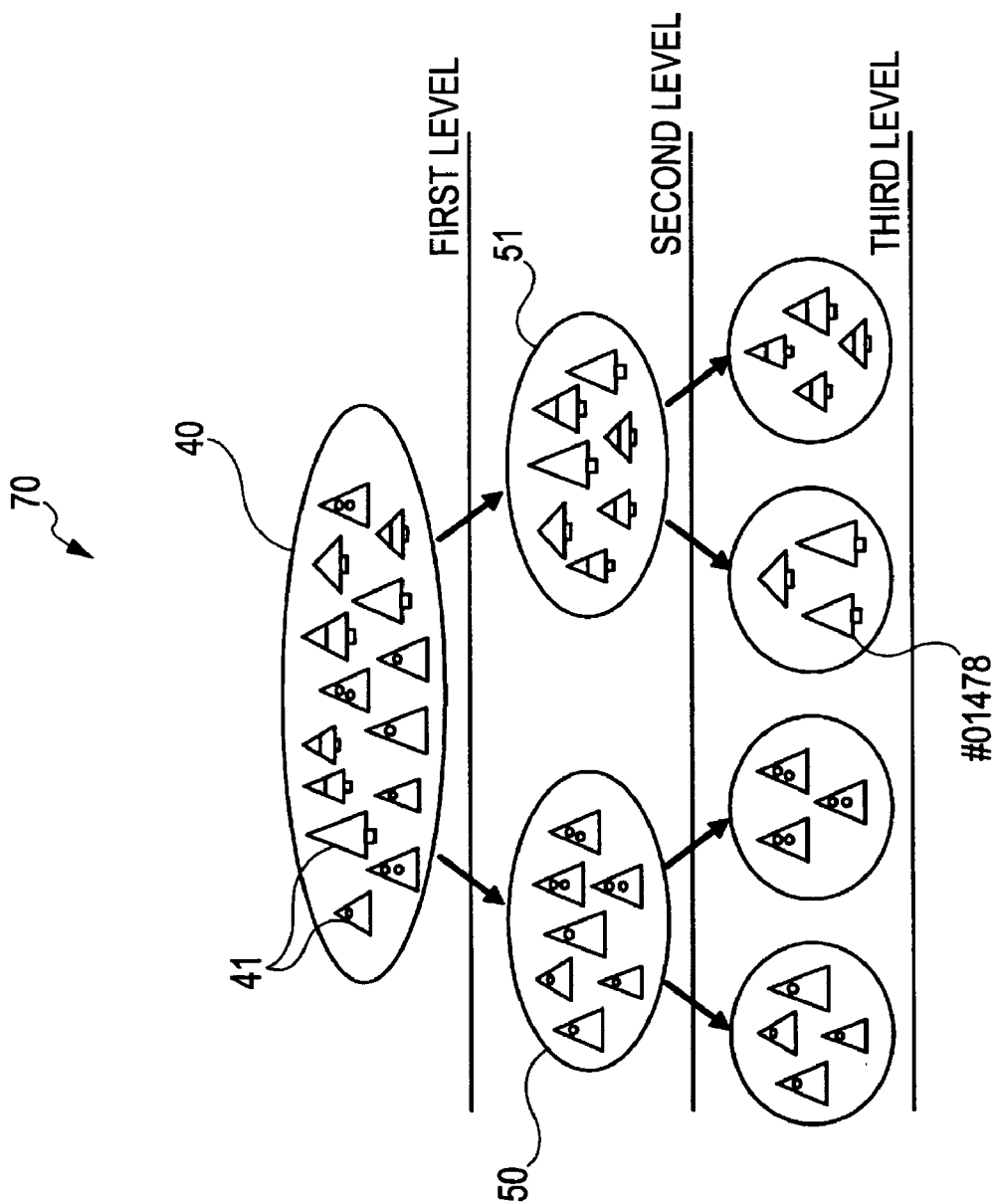
FIG. 9 is a diagram illustrating the classification hierarchy.

FIG. 9 is a diagram illustrating the classification hierarchy.

First, a whole search resultant 3D data group is assumed to be one cluster 40. This will be the first level.

Next, the 3D data group belonging to the cluster 40 is classified into K clusters using vectors of feature data corresponding to each piece of 3D data 41. In FIG. 9, K is 2. This is the second level and, in FIG. 9, the cluster 40 is classified into two clusters 50 and 51. By repeating hereafter a similar classification as many times as a predetermined number, a classification hierarchy 70 is generated.

The k-means method, for example, is used as a clustering method. In the k-means method, first a set of feature data corresponding to N pieces of target 3D data is assumed to be a feature data group Vi (i=1, 2, ..., N). "Vi" is a vector and the aforementioned shape distribution method, for example, is used as the calculation method of feature data. If the number of bins in a histogram of shape distribution is 100, the vector will be a 100-dimensional vector. The feature data group Vi is classified into K clusters by a method shown below. The clustering method will be described below in detail.

Figure 10:
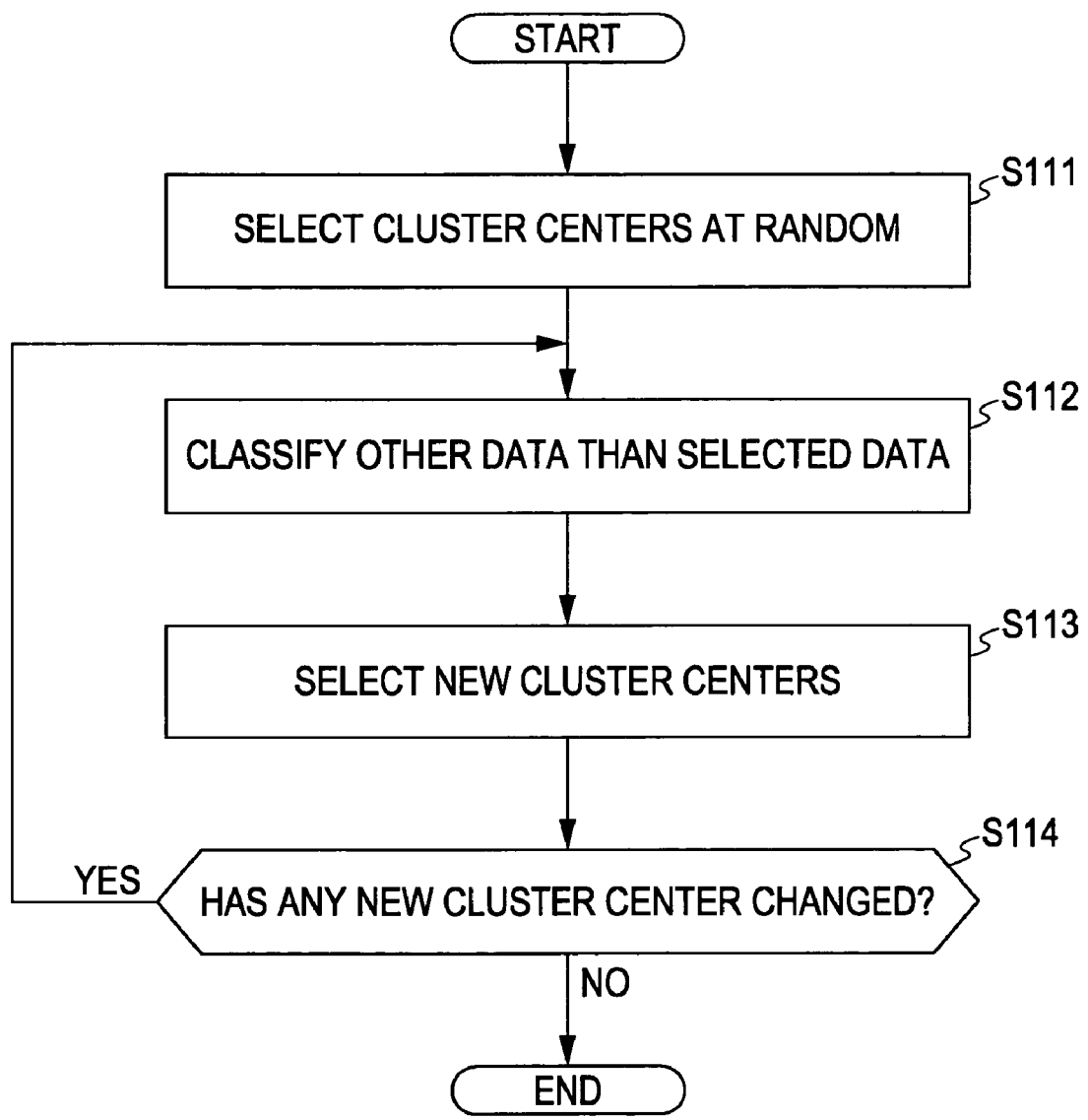
FIG. 10 is a flow chart illustrating a clustering method.

FIG. 10 is a flow chart illustrating the clustering method.

First, the classification hierarchy generation unit 180 randomly selects K cluster centers from the feature data group Vi (i=1, 2, ..., N) (step S111).

Next, the classification hierarchy generation unit 180 classifies each piece of feature data other than the selected K pieces of feature data into a cluster of feature data of the cluster center from which the euclidean distance is shortest.

Next, the classification hierarchy generation unit 180 selects feature data Via which is nearest to the center of gravity in each of K classification resultant clusters (step S113).

Next, the classification hierarchy generation unit 180 determines whether or not any new cluster center has changed (step S114). The classification hierarchy generation unit 180 terminates clustering when no cluster center changes (step S114 No). If any cluster center changes (if any piece of feature data of new cluster centers was not a cluster center immediately before) (step S114 Yes), the operation of step S112 and thereafter is repeated by returning to step S112.

Next, the selection method of design information in step S107 will be described.

First, the design information selection unit 200 calculates a cluster relevance ratio CR for each piece of design information corresponding to 3D data belonging to a cluster from which design information should be selected.

Figure 11:
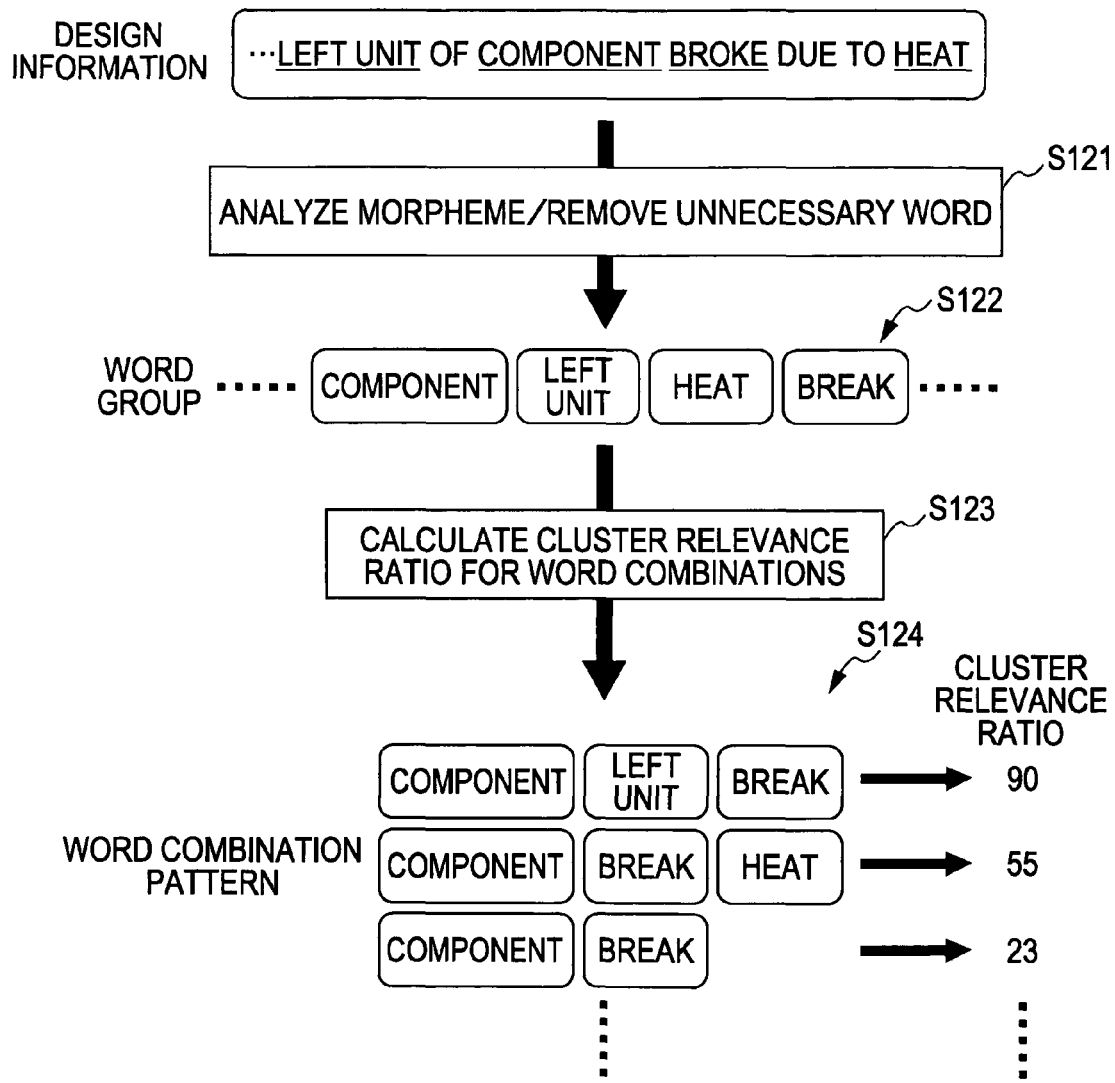
FIG. 11 is an explanatory view of a calculation method of a cluster relevance ratio.

FIG. 11 is an explanatory view of a calculation method of the cluster relevance ratio.

First, the design information selection unit 200 performs morpheme analysis of each sentence in text of design information to remove unnecessary words such as postpositional particles and punctuation marks (step S121). Unnecessary words are identified by, for example, registering them in a dictionary.

Next, the design information selection unit 200 creates combinations of each word after removing unnecessary words (step S122).

For each pattern of the word combination, the design information selection unit 200 calculates a cluster relevance ratio SCR regarding a sentence (step S123). The cluster relevance ratio SCR can be calculated by, for example, the following formula (1):

[Mathematical formula 1]

$$SCR = PF \times \log(N/n) + 1 \qquad (1)$$

Here, "PF" is the frequency of a word combination pattern in a cluster. "N" is the total number of pieces of search resultant 3D data and "n" is the number of pieces of 3D data among search resultant 3D data whose corresponding design information contains the word combination pattern. Incidentally, it is possible to set the upper limit of the number of words included in a word combination pattern. If the upper limit is 1, the cluster relevance ratio for words results. Next, the cluster relevance ratio CR of design information is assumed, like the following formula (2), to be the maximum value of cluster relevance ratio of word combination patterns included in the cluster.

$$CR = \max_{i}\{SCRi\} \qquad (2)$$

Here, SCRi is the cluster relevance ratio of an i-th sentence. Also, like the following formula (3), an average value may be adopted or values obtained by other operations.

$$CR = \sum_{i} SCRi \qquad (3)$$

The design information selection unit 200 selects design information whose cluster relevance ratio calculated by the above method is larger than a predetermined threshold in each cluster is selected as the design information of the cluster (step S124). Instead of a whole text consisting of a plurality of sentences, each sentence contained therein may be selected as the unit of design information and, in this case, the cluster relevance ratio SCR of each sentence is used as the cluster relevance ratio CR.

The design information selection unit 200 sets design information IDs of 3D data IDs selected for each cluster to the design information table 201.

Next, the display method of 3D data and design information in step S108 will be described in detail.

First, the designer specifies the level to be displayed of a classification hierarchy using the keyboard 105a or mouse 105b. For example, a numeric value corresponding to the level can be input from the keyboard 105a. The display control unit 220 responds by referencing the classification hierarchy table 191 and design information table 201 to display 3D data groups and selected design information contained in clusters of the specified level in ways that the state of classification can be visually understood.

If, for example, the designer selects the second level to be displayed when, as shown in FIG. 9, the classification hierarchy generation unit 180 generates the classification hierarchy 70 in which one cluster is divided into two. In this case, the classification hierarchy table 191 is referenced by the display control unit 220 and the clusters 50 and 51 at the second level take the values "01" and "02" respectively. Then, design information corresponding to 3D data belonging to the clusters 50 and 51 is determined by referencing the design information table 201 and, among the design information, design information selected in step S107 is displayed.

Figure 12:
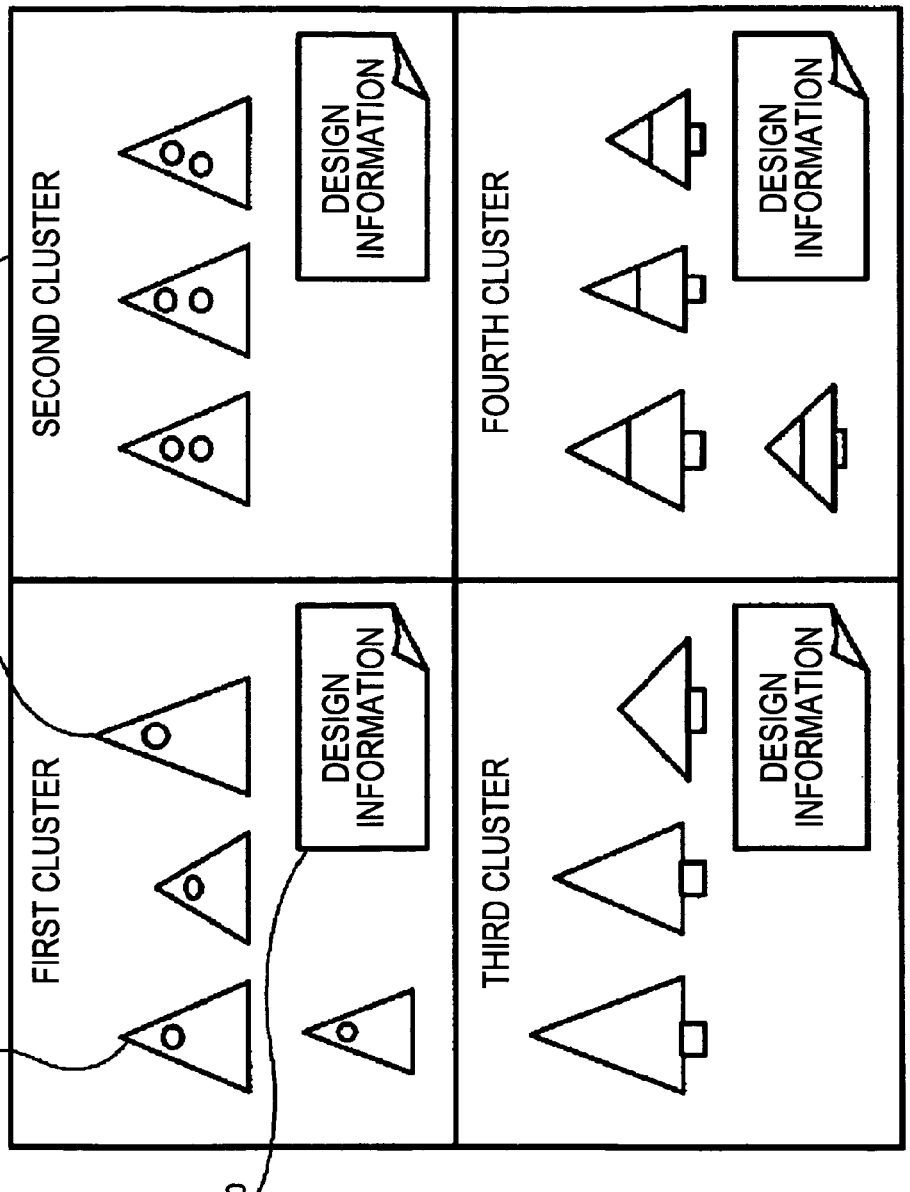
FIG. 12 is a diagram showing a display screen when a third level is specified for the classification hierarchy shown in FIG. 10.

FIG. 12 is a diagram showing a display screen when the third level is specified for the classification hierarchy shown in FIG. 10.

A display screen 60 is divided into four screens: a "first cluster", a "second cluster", a "third cluster", and a "fourth cluster". Clicking, for example, one of a plurality of pieces of 3D data 60a of the first cluster using the mouse 105b or the like displays sentences (content) of the design information in a portion 60b written as "Design. Information" in the first cluster.

If the designer wants to view one level up or one level down in a classification hierarchy, it becomes possible to move up or move down for viewing by providing a method for receiving such instructions. One method for receiving instructions is, for example, to display button icons for moving up or moving down on the monitor 104a and have the designer click such icons using the mouse 105b or the like. When displaying design information to the designer, the design information can be displayed in descending order of cluster relevance ratio calculated by the above formulas (2) or (3).

Figure 13:
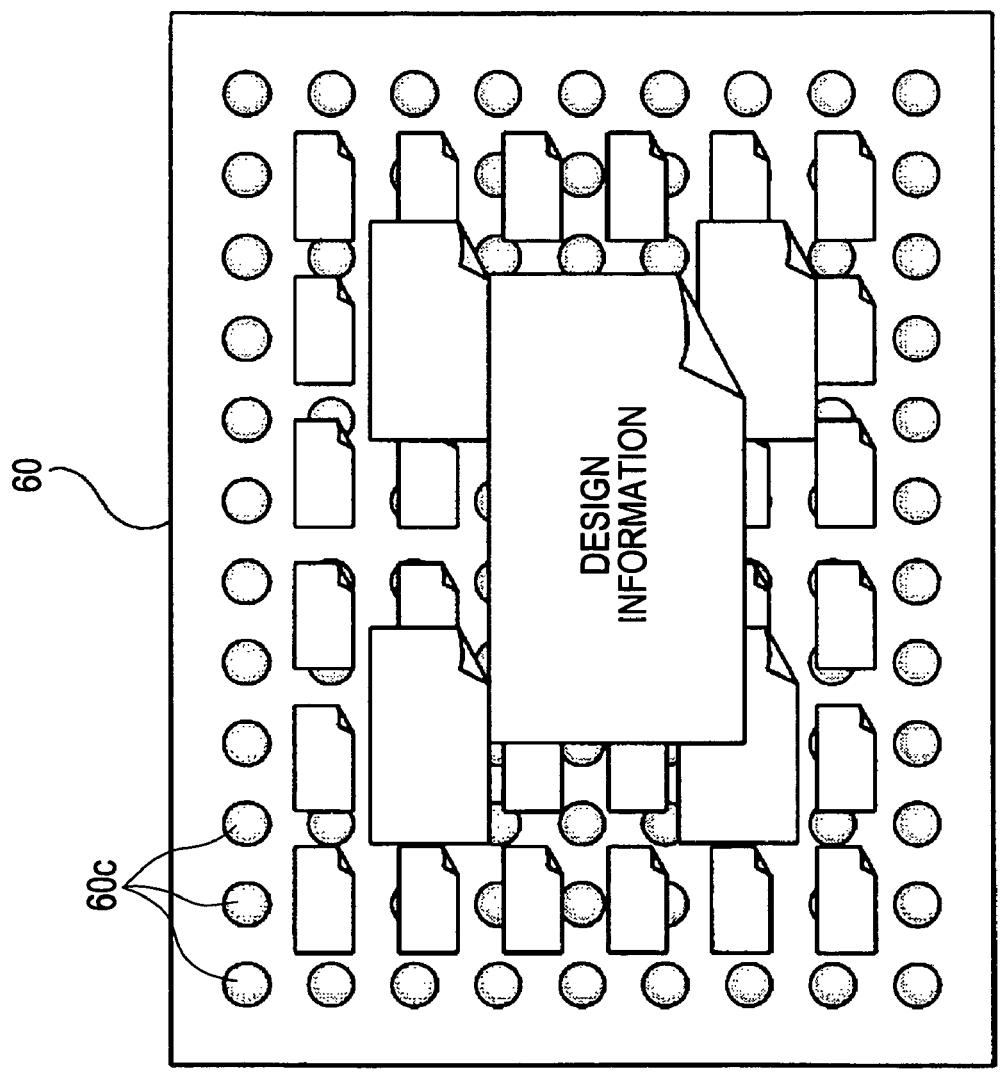
FIG. 13 is a diagram showing another example of the display screen when the third level is specified for the classification hierarchy shown in FIG. 10.

FIG. 13 is a diagram showing another example of the display screen when the third level is specified for the classification hierarchy shown in FIG. 10.

As shown in FIG. 13, it is also possible to display in a virtual 3D space all search resultant 3D data 60c by arranging the 3D data 60c at corresponding positions at the bottom while arranging design information of each cluster at each level at corresponding positions in a downward direction from above in the classification hierarchy. The designer can move to the position of a desired cluster by operating the mouse 105b or the like to check design information.

<Second Search Method>

Next, the second search method will be described by focusing on differences from the above first search method to avoid a repetition of the same description.

The second search method is a search method when, in addition to 3D data to be searched from the keyboard 105a or the like, a keyword for searching for design information is input by the designer.

Figure 14:
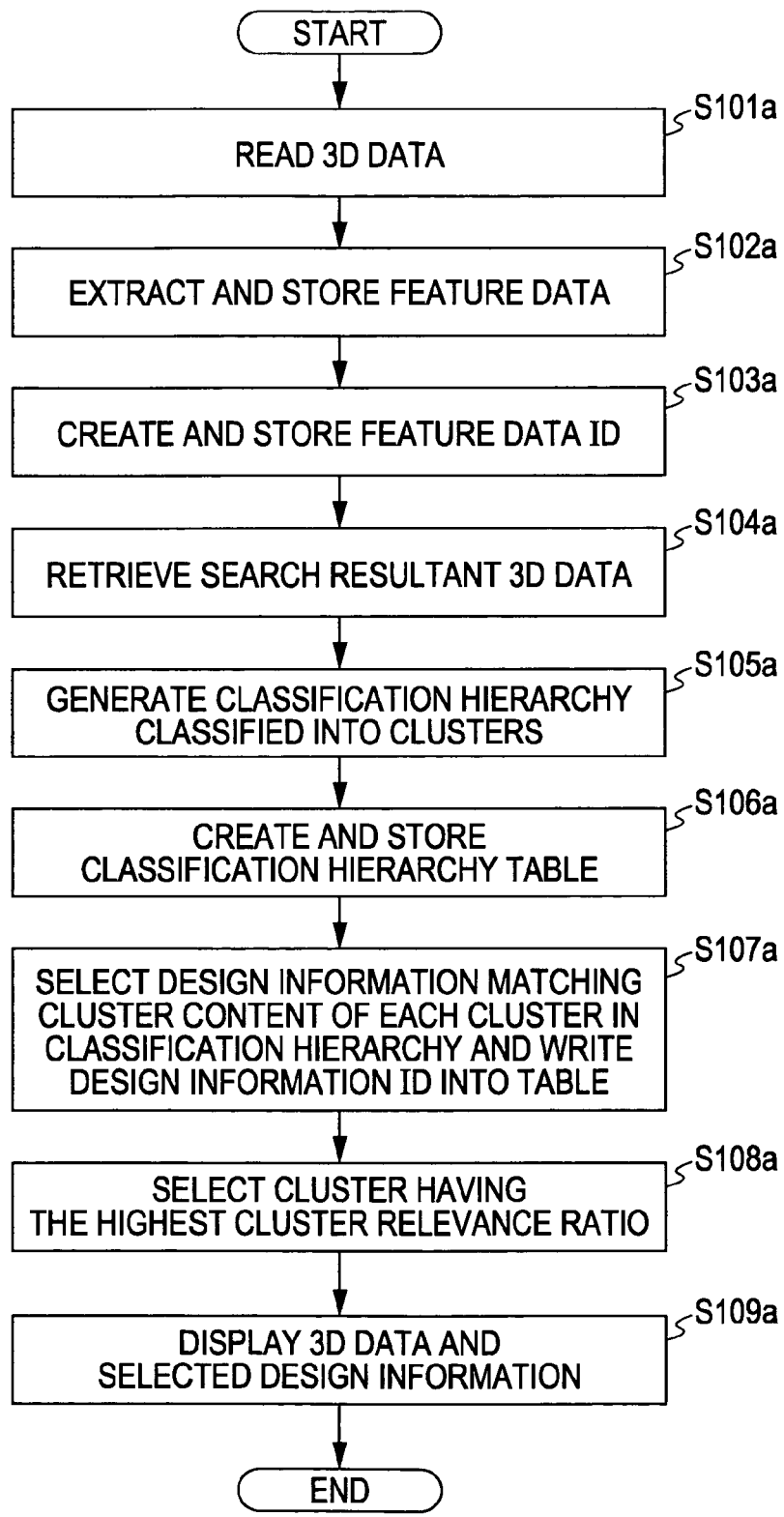
FIG. 14 is a flow chart illustrating a second search method.

FIG. 14 is a flow chart illustrating the second search method.

Steps S101a to S107a perform operations similar to those of steps S101 to S107.

Next, the display control unit 220 selects a cluster having the highest cluster relevance ratio of word combination patterns including a word of the keyword given by the designer for design information selected in each cluster (step S108a).

Next, the display control unit 220 displays 3D data groups and design information belonging to the selected cluster on the monitor 104a (step S109a).

<Third Search Method>

Next, the third search method will be described by focusing on differences from the above first search method to avoid a repetition of the same description.

The third search method is a search method when a plurality of pieces of 3D data to be searched are input into the search key input reception unit 160.

Figure 15:
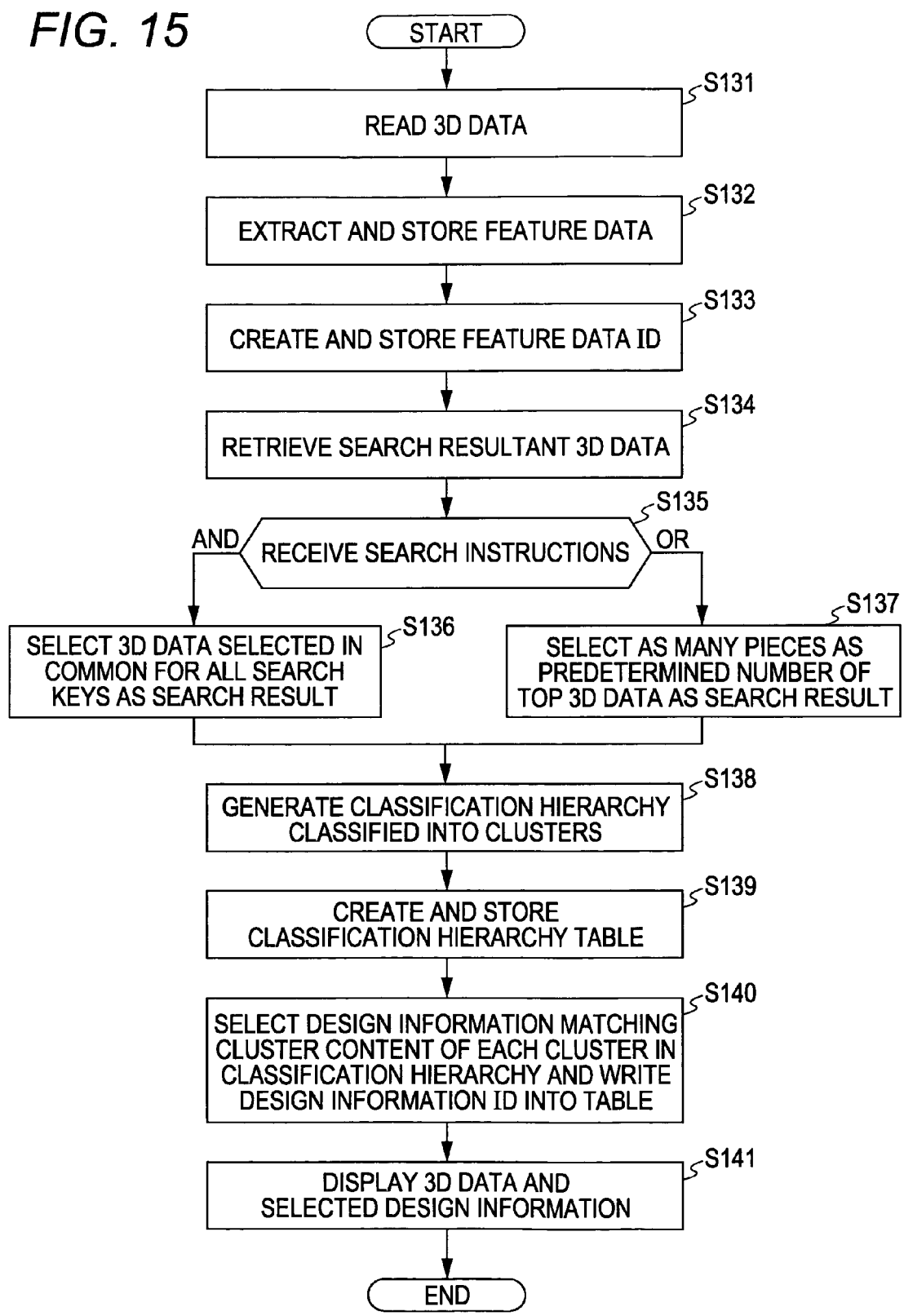
FIG. 15 is a flow chart illustrating a third search method.

FIG. 15 is a flow chart illustrating the third search method.

First, the search key input reception unit 160 reads a plurality of pieces of 3D data to be searched (step S131).

Next, the feature extraction unit 130 extracts feature data representing shape features of each piece of read 3D data to be searched as a vector and stores the vector in the feature data storage unit 140 (step S132).

Next, the feature extraction unit 130 creates a feature data ID corresponding to the extracted feature data and associates the feature data ID with an ID of 3D data to be searched before storing it in the feature data table 151 (step S133).

Next, the similarity shape search unit 170 reads all feature data stored in the feature data storage unit 140 and calculates euclidean distances between 3D data to be searched and the feature data. Then, the similarity shape search unit 170 orders 3D data to be searched in ascending order of euclidean distance, selecting a predetermined number of 3D data IDs from the top as a search result (step S134).

Next, the search key input reception unit 160 receives a search instruction of "AND search" or "OR search" from the designer via the keyboard 105a or mouse 105b (step S135). If the search instruction is "AND search" (step S135 AND), the similarity shape search unit 170 selects as many pieces as a determined number of 3D data in similarity order from the top for each search key and selects 3D data selected for all search keys in common as a search result (step S136). If the search instruction is "OR search" (step S135 OR), the similarity shape search unit 170 selects as many pieces as the determined number of 3D data in similarity order from the top for each search key and selects them as a search result (step S137).

Hereinafter, steps S138 to S141 perform operations similar to those of steps S105 to S108.

Next, the calculation method of similarity order for a search result of "AND search" in step S135 will be described. First, the similarity shape search unit 170 calculates an average value of similarity order for each search key. The order in ascending order of this average value will be the order of the final search result.

Next, the calculation method of similarity order for a search result of "OR search" in step S135 will be described. The similarity shape search unit 170 calculates a minimum value of similarity order for each search key for each piece of 3D data. The order in ascending order of this minimum value will be the order of the final search result.

As has been described above, according to the present embodiment, design information considering the range of similarity can be easily acquired, enabling the designer to reduce time and efforts required to check design information.

Even if documents whose similarity ranges are different are mixed in a text of design information, content of design information associated with classified clusters will be selectable, enabling the designer to further reduce time and efforts required to check up design information.

If design information should be checked up while viewing all 3D data of a search result, time and efforts required for the designer to check up design information can be reduced.

Here, the design information selection unit 200 reads design information corresponding to each cluster classified in a classification hierarchy generated by the classification hierarchy generation unit 180 from the design information storage unit 120. Then, the design information selection unit 200 orders, among a set of the design information, design information associated with the cluster and not associated any other cluster in descending order of degree of association with the cluster. Then, the display control unit 220 displays the design information on the monitor 104a according to the order. In this way, when the designer wants to check up design information in a shortest possible time, design information with a high degree of association with clusters of interested classification are obtained, enabling the designer to reduce time and efforts required to check up design information.

Also, the design information selection unit 200 reads design information corresponding to 3D data belonging to each cluster classified in a classification hierarchy generated by the classification hierarchy generation unit 180 from the design information storage unit 120. Then, the design information selection unit 200 orders, among a set of the design information, design information associated with the cluster and not associated any other cluster in descending order of degree of association with the cluster. Then, the display control unit 220 displays the design information on the monitor 104a according to the order and, after displaying all design information corresponding to clusters, design information of clusters one level up in the classification hierarchy is similarly displayed and this process is repeated up to the highest level to display design information. In this way, when design information should be checked up in a direction from design information of clusters whose similarity range is clear toward design information of clusters whose similarity range is not clear or design information should be checked up in the opposite direction, time and efforts required for the designer to check up design information can be reduced.

Also, according to the second search method, when information about a specific fault related to content described in design information should be checked up and a keyword related to matter to be checked up can be recalled, time and efforts required for the designer to check up design information can be reduced.

Also, according to the third search method, when a plurality of pieces of 3D data to be searched are input, time and efforts required for the designer to check up design information can be reduced.

Up to now, the design support apparatus and design support method of the present invention have been described based on the illustrated embodiments, but the present invention is not limited to these and components in each portion can be replaced with those having similar functions. In addition, any other component or step may be attached to the present invention.

Also, the present invention may be a combination of any two or more components (features) of the above embodiments.

The present invention is applied to 3D-CAD in the above embodiments, but the present invention is not limited to this and can be applied, for example, to 2D-CAD and image data of a drawing created on paper and read by a scanner.

The above processing functions can be realized by a computer (by having a computer execute a predetermined design support program). In that case, the design support program 100 provides a program in which processing content of functions to be equipped is described. By executing the program on a computer, the above processing functions are realized on the computer. The program in which processing content is described can be recorded in a recording medium that can be read by a computer. The computer readable medium includes, for example, a magnetic recorder, optical disc, magneto-optical recording medium, and semiconductor memory. The magnetic recorder includes, for example, a hard disc device (HDD), flexible disc, and magnetic tape. The optical disc includes, for example, a DVD (Digital Versatile Disc), DVD-RAM (Random Access Memory), CD-ROM (Compact Disc Read Only Memory), and CD-R (Recordable)/RW (ReWritable). The magneto-optical recording medium includes, for example, MO (Magneti-Optical disc).

For distribution of a program, portable recording media such as DVD and CD-ROM in which the program is recorded are sold. The program can also be transferred from a server computer to other computers via a network after storing the program in a storage device of the server computer.

A computer executing a design support program stores, for example, a program recorded in a portable recording medium or a program transferred from a server computer in its storage device. Then, the computer reads the program from its storage device and performs processing according to the program. Incidentally, the computer can perform processing according to a program by directly reading the program from a portable recording medium. The computer can also perform processing according to a received program successively each time a program is transferred from a server computer.

What is claimed is:

1. A non-transitory computer readable recording medium storing a design support program executed by computer, the program providing information considering a range of similarity, the program comprising the steps of:
 storing feature associated information associating a plurality of pieces of design data that can be classified for each structure and feature data provided corresponding to each piece of the design data and representing features of the design data;
 extracting the feature data corresponding to the design data to be searched upon receiving the design data to be searched;
 checking the extracted feature data against the feature data associated with the feature associated information, ordering the design data associated with the feature associated information in descending order of similarity to the design data to be searched, retrieving at least one piece of the ordered design data;
 generating a classification hierarchy consisting of a plurality of pieces of classification data obtained by classifying a set of the retrieved design data based on a degree of feature similarity using the feature data associated with the feature associated information;
 calculating a cluster relevance ratio based on at least a number of pieces of the plurality of pieces of design data and a number of pieces of the retrieved design data;
 selecting the design information closely associated with the classification data by fetching the design information corresponding to the design data contained in the classification data from the design associated information associating the design data and the design information representing design know-how and skills, the calculated cluster relevance ratio of the selected design information being larger than a predetermined threshold in each cluster; and
 displaying the classification data in a predetermined form together with the selected design information.

2. The non-transitory computer readable recording medium according to claim 1, wherein the step of generating the classification hierarchy generates the classification hierarchy in which a plurality of pieces of classification data obtained by classifying a set of the design data for each range of similar regions in stages of fineness of classification thereof are represented.

3. The non-transitory computer readable recording medium according to claim 1, wherein the step of selecting the design information selects from the fetched design information design information associated with classification data including the fetched design information and not associated with the other classification data as design information of the classification data.

4. The non-transitory computer readable recording medium according to claim 3, wherein the step of selecting the design information selects a plurality of pieces of the design information ordered according to a degree off association with the classification data, and
 the display displays the plurality of pieces of the design information according to the order.

5. The non-transitory computer readable recording medium according to claim 1, wherein the step of displaying similarly displays design information for the classification data one level up of the classification hierarchy and displays the design information by repeating this process up to a highest level of the classification hierarchy.

6. The non-transitory computer readable recording medium according to claim 1, wherein if a keyword for searching for the design information is input together with the design data to be searched, the step of displaying calculates a degree of association of the selected design information and the keyword to display the design information having a highest degree of association.

7. The non-transitory computer readable recording medium according to claim 1, wherein
 if a plurality of pieces of the design data to be searched are received, the step of extracting the features extracts the feature data of each piece of the received design data;
 the step of doing the similarity search retrieves a set of the design data for each piece of the design data to be searched, and
 the step of generating the classification hierarchy takes a first mode in which the classification hierarchy is generated using the design data that is common to each set of the retrieved design data and a second mode in which the classification hierarchy is generated using as many pieces as a predetermined number of the highly ordered design data for each set of the retrieved design data.

8. The non-transitory computer readable recording medium according to claim 1, wherein
 the design data is CAD data, and
 the feature data is data representing features of shapes thereof in quantities from the CAD data.

9. The non-transitory computer readable recording medium according to claim 1, wherein the step of displaying arranges search resultant design data in ways that hierarchy classification results can be visually understood for the classification hierarchy and further arranges the design information selected for each piece of the classification data.

10. A design support method providing information considering a range of similarity, the method comprising the steps of:
 storing feature associated information associating a plurality of pieces of design data that can be classified for each structure and feature data provided corresponding to each piece of the design data and representing features of the design data;
 extracting the feature data corresponding to the design data to be searched upon receiving the design data to be searched;
 checking the extracted feature data against the feature data associated with the feature associated information, ordering the design data associated with the feature associated information in descending order of similarity to the design data to be searched, retrieving at least one piece of the ordered design data;
 generating a classification hierarchy consisting of a plurality of pieces of classification data obtained by classifying a set of the retrieved design data based on a degree of feature similarity using the feature data associated with the feature associated information;
 calculating a cluster relevance ratio based on at least a number of pieces of the plurality of pieces of design data and a number of pieces of the retrieved design data;
 selecting the design information closely associated with the classification data by fetching the design information corresponding to the design data contained in the classification data from the design associated information associating the design data and the design information representing design know-how and skills, the calculated cluster relevance ratio of the selected design information being larger than a predetermined threshold in each cluster; and displaying the classification data in a predetermined form together with the selected design information.

11. A design support apparatus providing information considering a range of similarity, the apparatus comprising:
- a feature associated information storage unit for storing feature associated information associating a plurality of pieces of design data that can be classified for each structure and feature data provided corresponding to each piece of the design data and representing features of the design data;
- a feature extraction unit for extracting the feature data corresponding to the design data to be searched upon receiving the design data to be searched;
- a similarity search unit for checking the feature data extracted by the feature extraction unit against the feature data associated with the feature associated information, ordering the design data associated with the feature associated information in descending order of similarity to the design data to be searched, retrieving at least one piece of the ordered design data;
- a classification hierarchy generation unit for generating a classification hierarchy consisting of a plurality of pieces of classification data obtained by classifying a set of the design data retrieved by the similarity search unit based on a degree of feature similarity using the feature data associated with the feature associated information;
- a cluster relevance ratio calculation unit for calculating a cluster relevance ratio based on at least a number of pieces of the plurality of pieces of design data and a number of pieces of the retrieved design data;
- a design information selection unit for selecting the design information closely associated with the classification data by fetching the design information corresponding to the design data contained in the classification data from the design associated information associating the design data and the design information representing design know-how and skills, the calculated cluster relevance ratio of the selected design information being larger than a predetermined threshold in each cluster; and
- a display control unit for displaying the classification data in a predetermined form together with the design information selected by the design information selection unit.

* * * * *